(12) United States Patent
Walker et al.

(10) Patent No.: US 8,775,111 B1
(45) Date of Patent: Jul. 8, 2014

(54) COOLING CONTROL CALIBRATION FOR THERMALLY-ISOLATED SELF-HEATING DEVICES

(75) Inventors: Anders P. Walker, Marion, IA (US);
Vadim Olen, Cedar Rapids, IA (US);
Jonathan A. Lovseth, Marion, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 100 days.

(21) Appl. No.: 13/034,100

(22) Filed: Feb. 24, 2011

(51) Int. Cl.
*G01K 7/00* (2006.01)
(52) U.S. Cl.
USPC .......................................... 702/109; 702/133
(58) Field of Classification Search
CPC .. G01K 2007/00; G01K 2007/16; G01K 7/00
USPC ............ 702/130, 133, 132, 136, 109; 347/29, 347/100
See application file for complete search history.

(56) References Cited

U.S. PATENT DOCUMENTS

2004/0239477 A1* 12/2004 Landsberger et al. ......... 338/195
2007/0261232 A1* 11/2007 Landsberger et al. ....... 29/610.1

OTHER PUBLICATIONS

Jiang L. et al., "Transient temperature performance of an integrated micro-thermal system", J. Micromech. Microeng. 10 (2000) 466-476.*
Gnanappa, et al., "Thermal performance analysis of a silicon microreactor for rapid DNA analysis", IEEE, 2006, 1330-1335.*

* cited by examiner

*Primary Examiner* — John Breene
*Assistant Examiner* — Ruihua Zhang
(74) *Attorney, Agent, or Firm* — Donna P. Suchy; Daniel M. Barbieri (57) ABSTRACT

The present invention is a method for capturing a cooling transfer function for a thermally-isolated, self-heating device. The method includes causing the device to undergo a plurality of successive heat-up cycles and cool-down cycles. The method further includes changing durations of time of the successive cool-down cycles. The method further includes deducing the cooling transfer function based upon temperature measurements for the device obtained at the end of the successive cool-down cycles (ex.—at the beginning of the successive heat-up cycles) of the device. The method thereby allows for capture of the cooling transfer function without direct observation of the cooling transfer function.

20 Claims, 4 Drawing Sheets

COOLING CONTROL CALIBRATION FOR THERMALLY-ISOLATED SELF-HEATING DEVICES

FIELD OF THE INVENTION

The present invention relates to the field of thermally-isolated, self-heating devices and particularly to a method of cooling control calibration for thermally-isolated self-heating devices.

BACKGROUND OF THE INVENTION

Controlling the temperature of thermally-isolated, self-heating devices (ex.—Microelectromechanical Systems (MEMS) devices) is important for enabling use of the devices. The temperature of such devices can be controlled using ovens or compensated by sensing temperature. Currently, the ability to accurately control the temperature of such devices is predicated upon obtaining heat transfer functions and cooling transfer functions for the devices, which describe how the devices heat and cool. In some currently available MEMS devices, in order to miniaturize as much as possible, the heater element of these devices also serves as the temperature sensing element of these devices, with said heating and temperature sensing element being known as a thermistor. However, for a device (ex.—MEMS device) implementing a thermistor, accurate measurement of the cooling transfer function of the device may be near impossible because, in order to measure the cooling transfer function, resistance of the thermistor must be measured. Further, in order to measure the resistance of the thermistor, current must be applied to it, which causes the thermistor to heat up. Consequently, currently available methods for capturing cooling transfer functions do not provide a desired level of accuracy.

Thus, it would be desirable to provide a method for capturing a cooling transfer function (ex.—providing cooling control calibration) for thermally-isolated self-heating devices which obviates the above-referenced problems associated with current solutions.

SUMMARY OF THE INVENTION

Accordingly, an embodiment of the present invention is directed to a method for capturing a cooling transfer function for a thermally-isolated, self-heating device, said method including: increasing a power level applied to a thermistor of the device from a first power level to a second power level, thereby causing a temperature of the device to increase from a first temperature to a second temperature; when the device is at the second temperature, reducing the power level applied to the thermistor of the device from the second power level to at least substantially the first power level; maintaining the power level applied to the thermistor of the device at the at least substantially the first power level for a first duration of time; upon expiration of the first duration of time, measuring the device temperature, the measured device temperature being a third temperature; and upon expiration of the first duration of time, increasing the power level applied to the thermistor of the device from the at least substantially the first power level to at least substantially the second power level, thereby causing the temperature of the device to increase from the third temperature to a fourth temperature; when the device is at the fourth temperature, reducing the power level applied to the thermistor of the device from the at least substantially the second power level to at least substantially the first power level; maintaining the power level applied to the thermistor of the device at the at least substantially first power level for a second duration of time, the second duration of time being one of: longer than the first duration of time or shorter than the first duration time; upon expiration of the second duration of time, measuring the device temperature, the measured device temperature upon expiration of the second duration of time being a fifth temperature; determining the cooling transfer function based upon the third temperature, the fifth temperature, the first duration of time, and the second duration of time, wherein determining the cooling transfer function includes: comparing the third temperature and the fifth temperature against the first duration of time and the second duration of time; and extrapolating the cooling transfer function based on said comparison, wherein the thermistor is a heating element and a temperature sensor for the device.

A further embodiment of the present invention is directed to a computer program product, including: a non-transitory, signal-bearing medium bearing one or more instructions for performing a method for capturing a cooling transfer function for a thermally-isolated, self-heating device, said method including: increasing a power level applied to a thermistor of the device from a first power level to a second power level, thereby causing a temperature of the device to increase from a first temperature to a second temperature; when the device is at the second temperature, reducing the power level applied to the thermistor of the device from the second power level to at least substantially the first power level; maintaining the power level applied to the thermistor of the device at the at least substantially the first power level for a first duration of time; upon expiration of the first duration of time, measuring the device temperature, the measured device temperature being a third temperature; and upon expiration of the first duration of time, increasing the power level applied to the thermistor of the device from the at least substantially the first power level to at least substantially the second power level, thereby causing the temperature of the device to increase from the third temperature to a fourth temperature; when the device is at the fourth temperature, reducing the power level applied to the thermistor of the device from the at least substantially the second power level to at least substantially the first power level; maintaining the power level applied to the thermistor of the device at the at least substantially first power level for a second duration of time, the second duration of time being one of: longer than the first duration of time or shorter than the first duration time; upon expiration of the second duration of time, measuring the device temperature, the measured device temperature upon expiration of the second duration of time being a fifth temperature; determining the cooling transfer function based upon the third temperature, the fifth temperature, the first duration of time, and the second duration of time, wherein determining the cooling transfer function includes: comparing the third temperature and the fifth temperature against the first duration of time and the second duration of time; and extrapolating the cooling transfer function based on said comparison, wherein the thermistor is a heating element and a temperature sensor for the device.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

The performance of many devices is affected by changes in the temperature of their environment. Device temperature can be controlled using ovens or compensated by sensing temperature. Control tolerance is important, especially for devices having electrical properties dependent upon their mechanical dimensions, such as cavity filters, resonator elements in oscillators, and Microelectromechanical Systems (MEMS) devices. MEMS devices are especially affected by thermal expansion and contraction, as they are often made up of many different materials (having different thermal coefficients of expansion) on a very small scale. Controlling the temperature of these devices currently requires obtaining heat transfer functions and cooling transfer functions for the devices, which describe how the devices heat and cool.

A currently-implemented method for capturing a heat transfer function and a cooling transfer function of one of these devices includes the following steps: 1) activating a heater element of the device with a step (ex.—a sudden increase in heating from zero to full power); 2) observing a first temperature response of the device to capture the heat transfer function; 3) after the device stabilizes at some temperature, deactivating the heater element of the device; and 4) observing a second temperature response of the device to capture the cooling transfer function. In some currently available MEMS devices, in order to miniaturize as much as possible, the heater element of these devices also serves as the temperature sensing element of these devices, said heating and temperature sensing element being known as a thermistor. For a device (ex.—MEMS device) in which a thermistor is implemented, current is sourced into the thermistor which causes the thermistor to heat up, thereby providing heat to the device. Further, temperature is measured by measuring the resistance of the thermistor even as current is being applied to it to produce heating. For a device (ex.—MEMS device) implementing a thermistor, the currently-implemented method (described above) for capturing the heat transfer function of the device may be utilized to attain accurate measurement of the heat transfer function. However, for a device (ex.—MEMS device) implementing a thermistor, accurate measurement of the cooling transfer function of the device may be near impossible because, in order to measure the cooling transfer function, resistance of the thermistor must be measured. Further, in order to measure the resistance of the thermistor, current must be applied to it, which causes the thermistor to heat up. Consequently, accurate measurement of the cooling transfer function of the device may be near impossible. Still further, in some devices, cool-down of the device is so much slower than heat-up, that measuring of cooling is precluded due to the fact that power is constantly having to be applied to the thermistor in an effort to obtain a measurement.

Another currently-implemented solution for obtaining a measurement of a cooling transfer function of a device involves utilizing pulsed heater power to obtain discrete measurements. However, the pulsed heater power method also fails to provide a desired level of accuracy for most temperature-sensitive devices. For example, curve data points captured utilizing the pulsed heater power method do not match the cooling curve and it is therefore very difficult to obtain a fit to the cooling transfer function.

Thus, it would be desirable to provide a method for capturing a cooling transfer function (ex.—providing cooling control calibration) for thermally-isolated, self-heating devices which obviates the above-referenced problems associated with current solutions.

Figure 4:
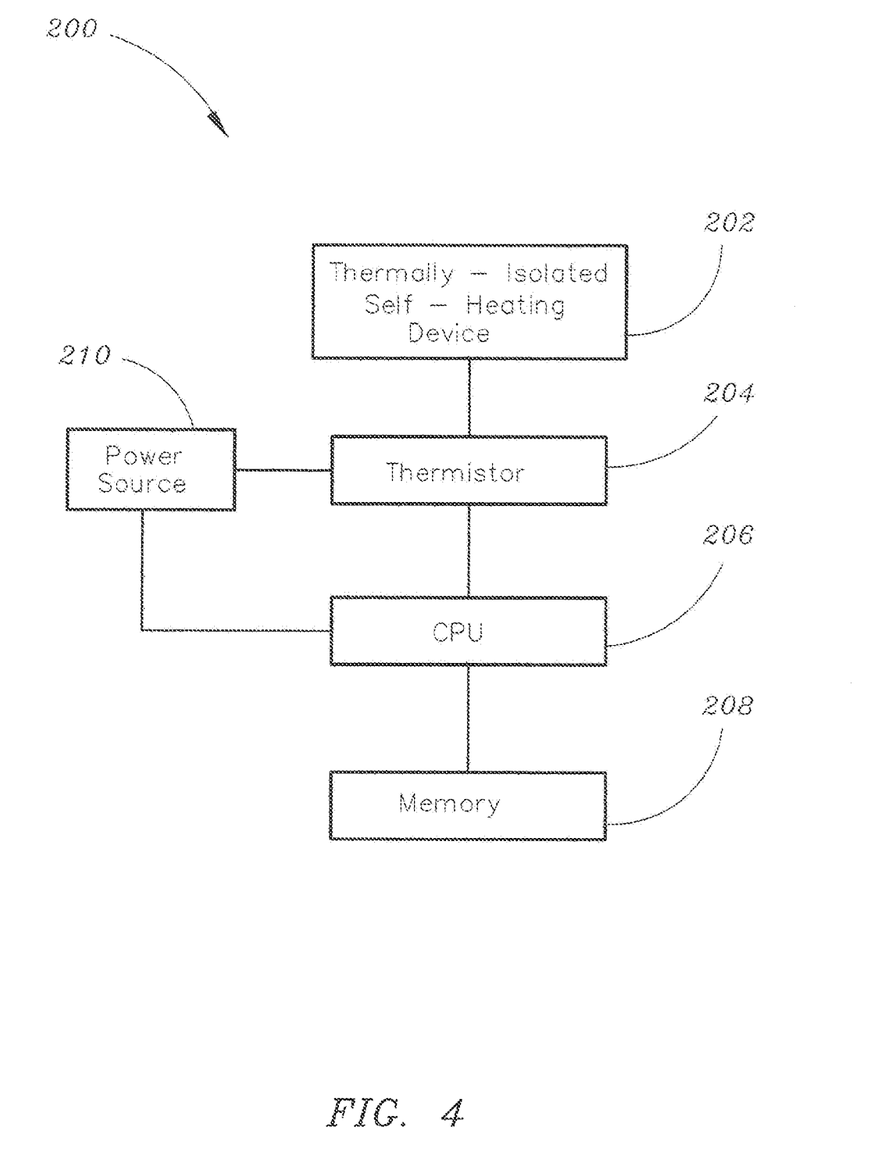
FIG. 4 is a block diagram schematic illustrating a system for capturing a cooling transfer function of a thermally-isolated, self-heating device, in accordance with an exemplary embodiment of the present invention.

Referring to FIG. 4, a system 200 for capturing a cooling transfer function of a thermally-isolated, self-heating device (exs.—a MEMS device, a MEMS micro-ovenized device, a resonator element in an oscillator, a cavity filter, a MEMS ovenized resonator) 202 in accordance with an exemplary embodiment of the present invention is provided. The thermally-isolated, self-heating device 202 may be connected to (ex.—may include) a thermistor 204, said thermistor 204 being a heating element and a temperature sensing element for the device 202. Further, the thermistor 204 may be connected to a power source 210. Current may be sourced into the thermistor 204 from the power source 210. Still further, the system 200 may include a microcontroller or some form of automation (ex.—a Central Processing Unit (CPU) 206 and memory 208) which may be connected to the power source 210 and the thermistor 204 for: selectively activating and deactivating the power source 210, thereby selectively heating the thermistor 204 and the device 202; and obtaining signals (ex.—data signals) from the thermistor 204 via which temperature information for the thermistor 204 and the thermally-isolated, self-heating device 202 may be obtained.

Figure 1:
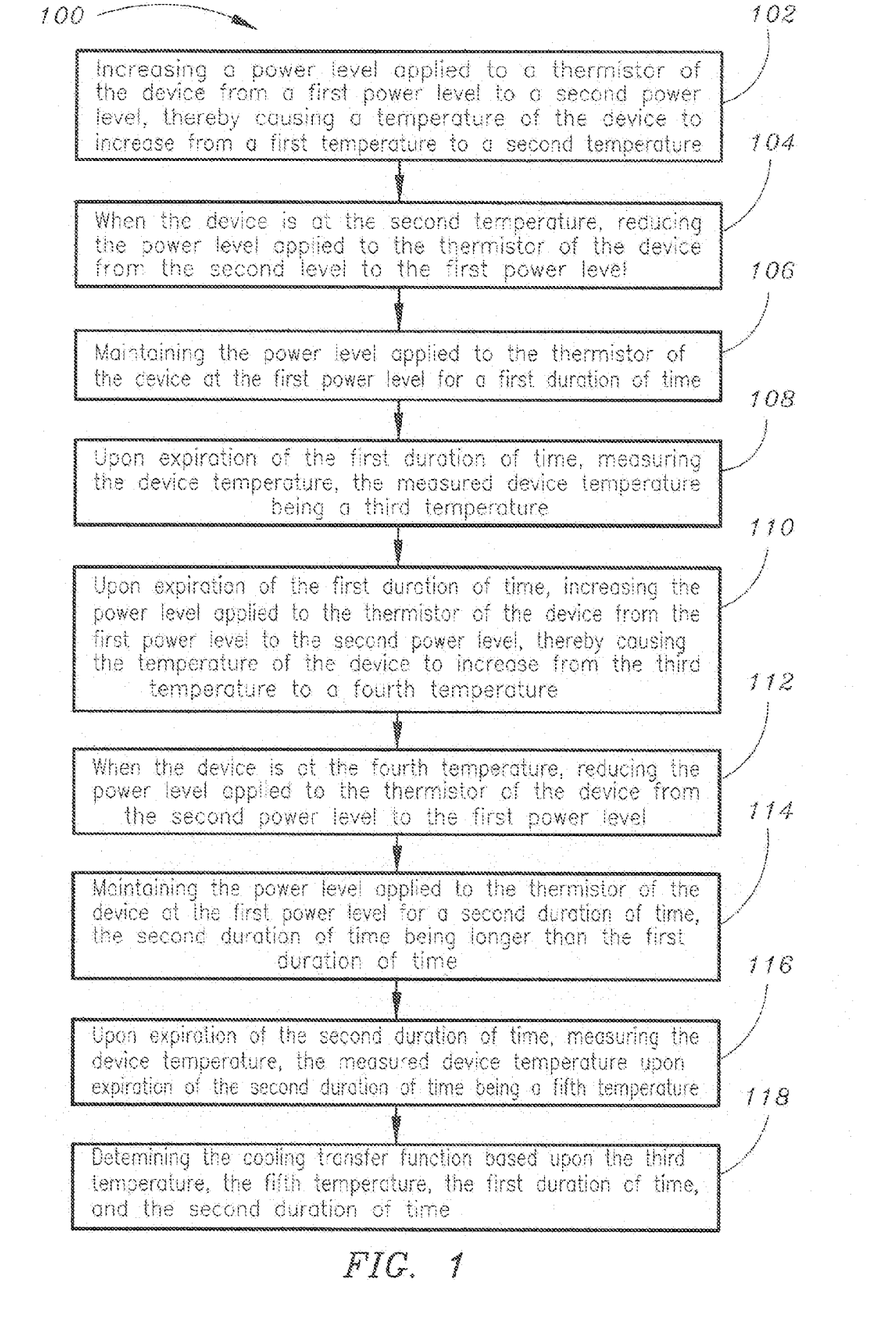
FIG. 1 depicts a flow chart illustrating a method for capturing a cooling transfer function for a thermally-isolated, self-heating device, in accordance with an exemplary embodiment of the present invention.

Referring to FIG. 1, a flowchart illustrating a method for capturing a cooling transfer function for a thermally-isolated, self-heating device (exs.—a MEMS device, a MEMS micro-ovenized device, a resonator element in an oscillator, a cavity filter, a MEMS ovenized resonator) in accordance with an exemplary embodiment of the present invention is provided. For example, using a microcontroller (or some other form of automation), the herein described method(s) may be performed. In exemplary embodiments, the method 100 may include the step of increasing a power level applied to a thermistor of the device from a first power level to a second power level, thereby causing a temperature of the device to increase from a first temperature to a second temperature 102. For instance, as shown in FIG. 4, current may be sourced into the thermistor (ex.—the heating element and temperature sensing element) 204 from a power source 210, thereby causing the thermistor 204 to heat up, which causes the device 202 to heat up (exs.—to experience an increase in temperature, to undergo a heat-up cycle). In exemplary embodiments, the thermistor 204 may be activated with a step (ex.—a sudden increase in heating power level from zero to full power). Thus, current may be applied to the thermistor 204 for causing power applied to the thermistor 204 to increase from a first power level (exs.—zero power, minimum power for the device, minimum operating power for the device) to a second power level (exs.—full power, maximum power for the device, maximum operating power for the device). The temperature response of the device 202 to the above-described increasing of the power level applied to the thermistor 204 may then be observed over time in order to capture the heating transfer function of the device 202. For instance, the thermistor 204 may also act as a temperature sensor and may sense the increase in temperature of the device 202 caused by the above-described increasing of power level applied to the thermistor 204. In exemplary embodiments, as the thermistor 204 acts as a temperature sensor, the thermistor 204 may measure the physical quantity (ex.—temperature) and may convert it into a signal which can be read by an observer or instrument. The temperature of the device 202 may be measured by measuring the resistance of the thermistor, even as current (ex.—power) is being applied to the thermistor 204 to produce heating.

In further embodiments, the method 100 may include the step of, when the device 202 is at the second temperature, reducing the power level from the second power level to at least substantially (ex.—to at or near) the first power level 104. For example, when the second power level (ex.—maximum power level for the device) is being applied to the thermistor 204, thereby causing the thermistor 204 to heat the device 202, the temperature of the device 202 may stabilize at a certain temperature (exs.—a peak temperature, the second temperature). When the device 202 is at this second temperature, the power level applied to the thermistor 204 may be reduced, such that the power level applied to the thermistor 204 may be reduced from the second power level to a lesser power level (ex.—the lesser power level being at or near the first power level). For instance, the thermistor 204 (ex.—the heating element functionality of the thermistor) of the device 202 may be deactivated. The temperature response of the device 202 to the above-described reducing of the power level applied to the thermistor 204 may then be observed over time. For instance, the thermistor 204 may also act as a temperature sensor and may sense the decrease in temperature of the device 202 caused by the above-described decreasing of the thermistor power level.

Figure 2:
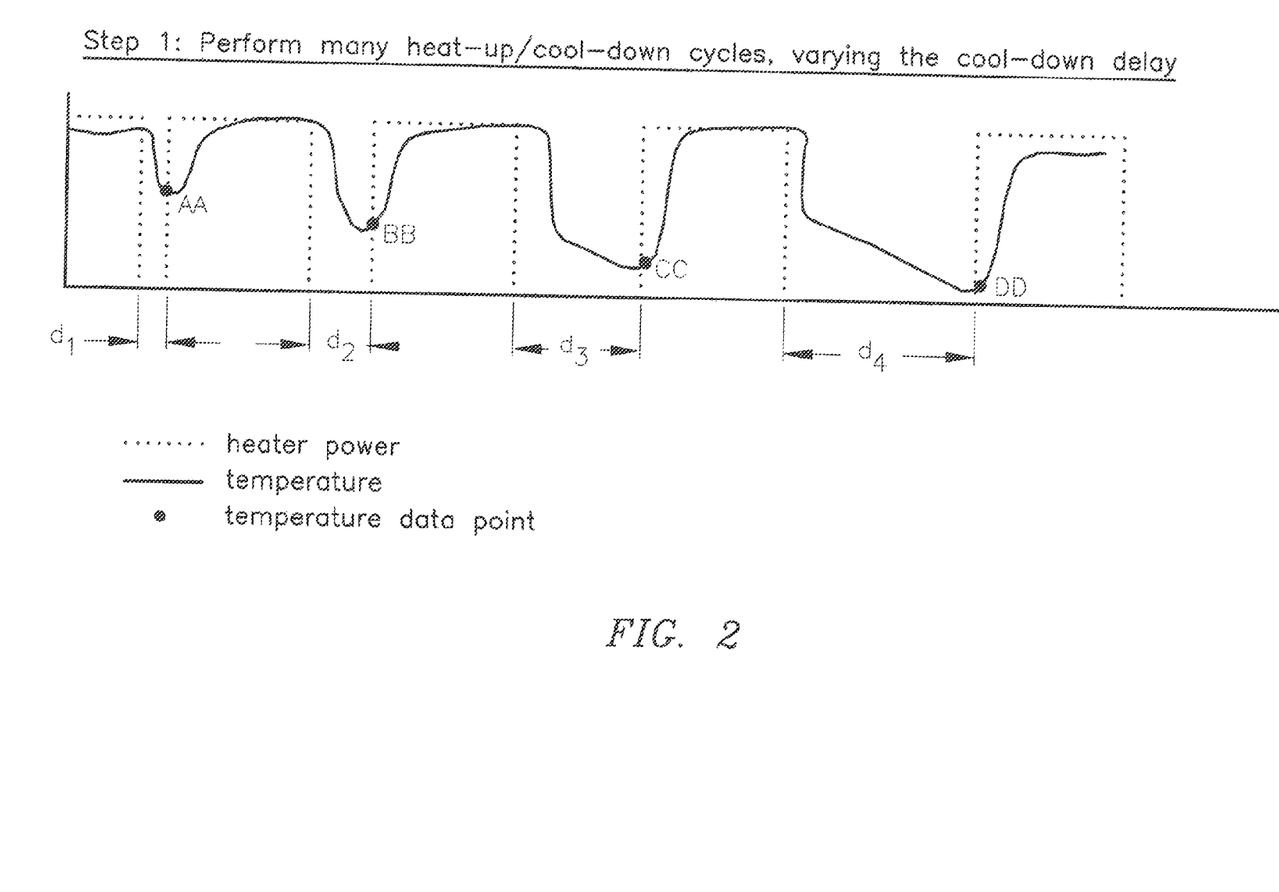
FIG. 2 is a graphical depiction illustrating performance of a plurality of heat-up/cool-down cycles for a device in which the length (ex.—duration) of each cool-down cycle is varied, said depiction further showing device temperatures measured upon expiration of the durations of time of the cool-down cycles.

In exemplary embodiments, the method 100 may further include the step of maintaining the power level applied to the thermistor 204 of the device 202 at the at least substantially the first power level (ex.—at or near the first power level) for a first duration of time 106. For example, the first duration of time may be a pre-programmed, non-zero amount of time for which the power level applied to the thermistor 204 of the device 202 is at the at least substantially the first power level (ex.—at or near the first power level) after the applied power level has been reduced as described above. The first duration of time (exs.—a cool-down delay, cooling delay) may be part of a cool-down cycle for the device 202. FIG. 2 illustrates a graphical depiction in which the power level applied to the thermistor 204 and the temperature of the device are plotted against the cooling delays for the device ($d_1$, $d_2$, $d_3$, $d_4$). The first duration of time (ex.—first cooling delay) is indicated by $d_1$.

In further embodiments, the method 100 may further include the step of, upon expiration of the first duration of time, measuring the device temperature, the measured device temperature being a third temperature 108. For instance, referring to FIG. 2, over the course of the first duration of time ($d_1$), as the device 202 cools down, the temperature of the device may decrease from the second temperature to the third temperature. Upon expiration of the first duration of time, the temperature of the device may be measured, the measured device temperature being the third temperature, as indicated by temperature data point (AA) shown in FIG. 2. For example, as shown in FIG. 2, the third temperature (AA) may be lower than the second temperature, but greater than the first temperature (i.e., the device 202 has cooled down from its second temperature, but may still be warmer than it was at a point right before the power level applied to the thermistor 204 was increased from the first power level to the second power level).

In exemplary embodiments, the method 100 may further include the step of, upon expiration of the first duration of time, increasing the power level applied to the thermistor 204 of the device 202 from the at least substantially at (ex.—at or near) the first power level to at least substantially at (ex.—at or near) the second power level, thereby causing the temperature of the device to increase from the third temperature to a fourth temperature (i.e., the device 202 undergoes a second heat-up cycle) 110. For instance, the thermistor 204 may be re-activated with a step (ex.—a sudden increase in heating power level from zero to full power for the device 202). The temperature response of the device 202 to the above-described increasing of the power level applied to the thermistor 204 may then be observed over time in order to capture the heating transfer function of the device 202.

In further embodiments, the method 100 may further include the step of, when the device 202 is at the fourth temperature, reducing the power level applied to the thermistor 204 of the device 202 from the at least substantially at (ex.—from at or near) the second power level to at least substantially (ex.—to at or near) the first power level 112. For example, when the at least substantially the second power level is being applied to the thermistor 204 during the second heat-up cycle, the temperature of the device may stabilize at a certain temperature (ex.—the fourth temperature). When the device 202 is at this fourth temperature, the power level applied to the thermistor 204 may be reduced, such that the power level applied to the thermistor 204 may be reduced from the at least substantially (ex.—from at or near) the second power level to a lesser power level (ex.—the lesser power level being at or near the first power level). For instance, the thermistor 204 (ex.—the heating element functionality of the thermistor) of the device 202 may be deactivated. The temperature response of the device to the above-described reducing of the power level applied to the thermistor 204 may then be observed over time. For instance, the thermistor 204 may also act as a temperature sensor and may sense the decrease in temperature of the device caused by the above-described decreasing of the thermistor power level.

In exemplary embodiments, the method 100 may further include the step of maintaining the power level applied to the thermistor 204 of the device 202 at the at least substantially at (ex.—at or near) the first power level for a second duration of time 114. For example, the second duration of time may be a pre-programmed, non-zero amount of time for which the power level applied to the thermistor 204 of the device 202 is at the at least substantially the first power level (ex.—at or near the first power level) after the applied power level has been reduced as described above. The second duration of time may be part of a second cool-down cycle for the device 202. Referring to FIG. 2, the second duration of time (ex.—second cooling delay) is indicated by $d_2$. In exemplary embodiments, the second duration of time may be longer than the first duration of time.

In further embodiments, the method 100 may further include the step of, upon expiration of the second duration of time, measuring the device temperature, the measured device temperature upon expiration of the second duration of time being a fifth temperature 116. For instance, referring to FIG. 2, over the course of the second duration of time ($d_2$), as the device 202 cools down, the temperature of the device may decrease from the fourth temperature to the fifth temperature. Upon expiration of the second duration of time, the temperature of the device may be measured, the measured device temperature being the fifth temperature, as indicated by temperature data point (BB) shown in FIG. 2. For example, as shown in FIG. 2, the fifth temperature (BB) may be lower than the fourth temperature, may be lower than the third temperature, but may be greater than the first temperature (i.e., the device 202 has cooled down from its fourth temperature, but may still be warmer than it was at a point right before the power level applied to the thermistor 204 was increased from the first power level to the second power level).

In the method(s) of the present invention, a plurality of subsequent heat-up cycles and cool-down cycles may be applied, as described above. Further, each subsequent duration of time (ex.—cool-down delay) may be longer than the cool-down delay directly preceding it, so that the measured device temperatures (AA, BB, CC, DD) (which are measured upon the expiration of the cool-down delays ($d_1$, $d_2$, $d_3$, $d_4$)) may gradually approach the first temperature of the device. In alternative embodiments, the cool-down delays may be implemented so that each successive cool-down delay is shorter than the cool-down delay directly preceding it. In further embodiments, a varying number of heat-up and cool-down cycles may be applied and varying number of device temperature measurements may be taken depending on the precision of the system applying said cycles and taking said measurements. For example, hundreds of heat-up and cool-down cycles may be applied and/or hundreds of device temperature measurements may be taken depending on the precision of the system applying said cycles and taking said measurements, thereby serving to increase the fidelity of the captured cooling transfer function.

Figure 3:
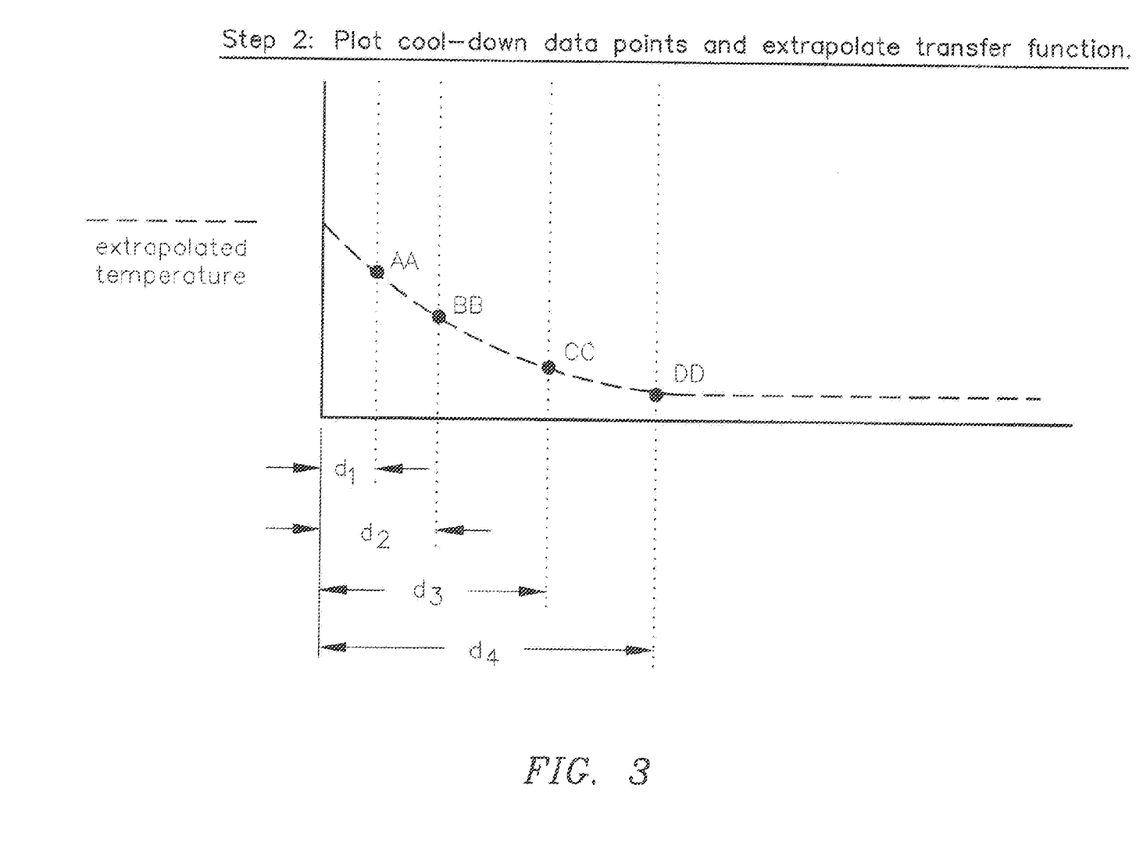
FIG. 3 is a graphical depiction illustrating device temperatures measured upon expiration of durations of time of the cool-down cycles for the device plotted against the cool-down cycle duration times, said depiction further showing the extrapolated temperature and/or the extrapolated cooling transfer function.

In exemplary embodiments, the method 100 may further include the step determining the cooling transfer function based upon the third temperature, the fifth temperature, the first duration of time, and the second duration of time 118. Further, determining the cooling transfer function may include: comparing the third temperature and the fifth temperature against the first duration of time and the second duration of time; and extrapolating the cooling transfer function based on said comparison. For instance, FIG. 3 shows a graphical depiction of the device temperatures (AA, BB, CC, DD) measured upon the expiration of the durations of time (ex.—upon expiration of the cool-down delays ($d_1$, $d_2$, $d_3$, $d_4$)) being plotted as data points against said cool-down delays ($d_1$, $d_2$, $d_3$, $d_4$). Further, the cooling transfer function (exs.—cool-down curve, cool-down transfer function, temperature curve) may be extrapolated from the plotted device temperatures (AA, BB, CC, DD), as shown in FIG. 3. Thus, by utilizing the method(s) of the present invention, the cooling transfer function may be captured, without having to directly observe it.

In further embodiments, the cooling transfer function captured via the method(s) of the present invention may be utilized for calibrating a control system for the device 202. The method(s) of the present invention may be utilized for promoting improved temperature control of a device (exs.—a MEMS device, a MEMS ovenized resonator) 202. For example, the method(s) of the present invention may be implemented for controlling the temperature of a micro-scale (ex.—a one cubic millimeter (1 $mm^3$)) resonator to within better than 0.01 degrees Celsius. As mentioned above, the ability to provide good temperature control for a device requires understanding of the heating transfer function (heat-up transfer function) and the cooling transfer function (cool-down transfer function) of the device. However, for devices which are heated through their temperature-sensing element (ex.—MEMS devices), it may be near impossible to capture the cooling transfer function directly because temperature measurement causes heating of the device. The method(s) of the present invention address these problems by allowing for the cool-down transfer function of such devices to be deduced from device temperature measurements taken at the beginning of a plurality of heat-up cycles for the device (ex.—device temperature measurements taken upon the expiration of a plurality of cool-down cycles for the device). Thus, with the method(s) of the present invention, the cool-down transfer function for such devices may be obtained without being directly observed. By promoting accurate characterization of the heating and cooling transfer functions of these thermally-isolated, self-heating devices, the method(s) of the present invention allow for more accurate temperature control of said devices, thereby enabling the use of such devices (ex.—MEMS micro-ovenized devices). In an exemplary embodiment, a MEMS micro-ovenized device may be a device which is over one-hundred times smaller, uses over one-hundred times less power, and/or costs over ten times less than comparable macro-scale devices.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for capturing a cooling transfer function for a thermally-isolated, self-heating device, the method comprising:
performing a first heat-up cycle by providing power to a self-heating thermistor of the device, wherein the self-heating thermistor is configured to produce heat and measure temperatures of the device when power is provided to the self-heating thermistor;
performing a plurality of heat-up/cool-down cycles, each heat-up/cool-down cycle including a heat-up cycle and a cool-down cycle, wherein each of the cool-down cycles of the plurality of the heat-up/cool-down cycles has a particular cool-down delay duration which is different than cool-down delay durations of other cool-down cycles of the plurality of heat-up/cool-down cycles, wherein a performance of each heat-up/cool-down cycle includes:
performing a particular cool-down cycle, wherein performing the particular cool-down cycle comprises:
deactivating the self-heating thermistor for the particular cool-down duration of the particular cool-down cycle;
performing a particular heat-up cycle upon an expiration of the particular cool-down duration of the particular cool-down cycle, wherein performing the particular heat-up cycle comprises:
activating the self-heating thermistor by providing a level of power to the self-heating thermistor; and
measuring a temperature at the beginning of the particular heat-up cycle upon activating the self-heating thermistor; and
obtaining a data point which includes the particular cool-down duration of the particular cool-down cycle and the temperature measured at the beginning of the particular heat-up cycle; and
determining the cooling transfer function based upon obtained data points which include cool-down durations of the cool-down cycles and temperatures measured at the beginning of the heat-up cycles.

2. The method of claim 1, wherein the self-heating thermistor does not measure temperature while the self-heating thermistor is deactivated.

3. The method of claim 1, wherein the particular cool-down delay duration of each of the cool-down cycles is predetermined.

4. The method of claim 1, wherein activating the self-heating thermistor by providing a level of power to the self-heating thermistor further comprises:
activating the self-heating thermistor by providing a level of power to the self-heating thermistor at least until temperatures measured by the thermistor stabilize.

5. The method of claim 1, wherein activating the self-heating thermistor by providing a level of power to the self-heating thermistor further comprises:
activating the self-heating thermistor by providing a particular level of power of at least two predetermined power levels to the self-heating thermistor at least until temperatures measured by the thermistor stabilize.

6. The method of claim 1, further comprising:
calibrating a control system for the device based upon the determined cooling transfer function.

7. The method of claim 6, further comprising:
controlling the temperature of the device based upon the determined cooling transfer function.

8. The method of claim 1, wherein performing a plurality of heat-up/cool-down cycles further comprises:
performing at least four heat-up/cool-down cycles.

9. The method of claim 1, wherein performing a plurality of heat-up/cool-down cycles further comprises:
performing at least one hundred heat-up/cool-down cycles.

10. The method of claim 1, wherein determining the cooling transfer function based upon obtained data points which include cool-down durations of the cool-down cycles and temperatures measured at the beginning of the heat-up cycles further includes:
plotting the obtained data points; and
fitting a curve to the obtained data points.

11. The method of claim 1, wherein determining the cooling transfer function based upon obtained data points which include cool-down durations of the cool-down cycles and temperatures measured at the beginning of the heat-up cycles further includes:
plotting the obtained data points; and
extrapolating the cooling transfer function from the plotted obtained data points.

12. The method of claim 1, wherein the particular cool-down delay duration of each of the cool-down cycles is predetermined.

13. The method of claim 1, wherein the device is a Microelectromechanical Systems (MEMS) device.

14. The method of claim 1, wherein the device is a Microelectromechanical Systems (MEMS) ovenized resonator.

15. The method of claim 1, wherein the device is at least one of a cavity filter or a resonator element of an oscillator.

16. A computer program product stored in a non-transitory computer-readable medium having computer-executable instructions, when executed, for performing a method for capturing a cooling transfer function for a thermally-isolated, self-heating device, the method comprising:
performing a first heat-up cycle by providing power to a self-heating thermistor of the device, wherein the self-heating thermistor is configured to produce heat and measure temperatures of the device when power is provided to the self-heating thermistor;
performing a plurality of heat-up/cool-down cycles, each heat-up/cool-down cycle including a heat-up cycle and a cool-down cycle, wherein each of the cool-down cycles of the plurality of the heat-up/cool-down cycles has a particular cool-down delay duration which is different than cool-down delay durations of other cool-down cycles of the plurality of heat-up/cool-down cycles, wherein a performance of each heat-up/cool-down cycle includes:
performing a particular cool-down cycle, wherein performing the particular cool-down cycle comprises:
deactivating the self-heating thermistor for the particular cool-down duration of the particular cool-down cycle;
performing a particular heat-up cycle upon an expiration of the particular cool-down duration of the particular cool-down cycle, wherein performing the particular heat-up cycle comprises:
activating the self-heating thermistor by providing a level of power to the self-heating thermistor; and
measuring a temperature at the beginning of the particular heat-up cycle upon activating the self-heating thermistor; and obtaining a data point which includes the particular cool-down duration of the particular cool-down cycle and the temperature measured at the beginning of the particular heat-up cycle; and determining the cooling transfer function based upon obtained data points which include cool-down durations of the cool-down cycles and temperatures measured at the beginning of the heat-up cycles.

17. A method for capturing a cooling transfer function for a thermally-isolated, self-heating device, the method comprising:

performing a first heat-up cycle by providing power to a self-heating thermistor of the device, wherein the self-heating thermistor is configured to produce heat and measure temperatures of the device when power is provided to the self-heating thermistor;

performing a plurality of heat-up/cool-down cycles, each heat-up/cool-down cycle including a heat-up cycle and a cool-down cycle, wherein each of the cool-down cycles of the plurality of the heat-up/cool-down cycles has a particular cool-down delay duration which is different than cool-down delay durations of other cool-down cycles of the plurality of heat-up/cool-down cycles, wherein a performance of each heat-up/cool-down cycle includes:

performing a particular cool-down cycle, wherein performing the particular cool-down cycle comprises:

reducing a level of power provided to the self-heating thermistor for the particular cool-down duration of the particular cool-down cycle, wherein the self-heating thermistor does not measure temperature during the particular cool-down cycle;

performing a particular heat-up cycle upon an expiration of the particular cool-down duration of the particular cool-down cycle, wherein performing the particular heat-up cycle comprises:

increasing a level of power provided to the self-heating thermistor; and measuring a temperature at the beginning of the particular heat-up cycle upon increasing the level of power provided to the self-heating thermistor; and obtaining a data point which includes the particular cool-down duration of the particular cool-down cycle and the temperature measured at the beginning of the particular heat-up cycle; and determining the cooling transfer function based upon obtained data points which include cool-down durations of the cool-down cycles and temperatures measured at the beginning of the heat-up cycles.

18. The method of claim 17, wherein the particular cool-down delay duration of each of the cool-down cycles is predetermined.

19. The method of claim 17, wherein increasing a level of power provided to the self-heating thermistor further comprises:

increasing a level of power provided to the self-heating thermistor at least until temperatures measured by the thermistor stabilize.

20. The method of claim 17, wherein performing a plurality of heat-up/cool-down cycles further comprises:

performing at least four heat-up/cool-down cycles.

* * * * *